United States Patent
McPhie et al.

(10) Patent No.: US 9,280,590 B1
(45) Date of Patent: Mar. 8, 2016

(54) SYSTEMS AND METHODS FOR ATTRIBUTE-BASED USER DATA VISUALIZATIONS

(71) Applicant: Google Inc., Mountain View, CA (US)

(72) Inventors: Jonathan McPhie, Mountain View, CA (US); Finnegan Southey, Mountain View, CA (US); Dan Fredinburg, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 178 days.

(21) Appl. No.: 14/050,639

(22) Filed: Oct. 10, 2013

(51) Int. Cl.
 *G06F 17/30* (2006.01)
 *G06F 11/34* (2006.01)

(52) U.S. Cl.
 CPC ...... *G06F 17/30572* (2013.01); *G06F 11/3438* (2013.01)

(58) Field of Classification Search
 None
 See application file for complete search history.

(56) References Cited

U.S. PATENT DOCUMENTS

| 6,310,630 B1 | 10/2001 | Kulkarni et al. |
| 6,996,536 B1 | 2/2006 | Cofino et al. |
| 8,180,778 B1 | 5/2012 | Pedersen et al. |
| 2012/0166971 A1 | 6/2012 | Sachson et al. |

OTHER PUBLICATIONS

Oh, J., et al., A Study for Classification of Web Browser Log and Timeline Visualization, Information Security Applications, Lecture Notes in Computer Science, vol. 7690, 2012, pp. 192-207.

*Primary Examiner* — Hung Q Pham
(74) *Attorney, Agent, or Firm* — Procopio, Cory, Hargreaves & Savitch LLP

(57) ABSTRACT

Systems and methods for attribute-based user data visualizations are described, including determining that an event is associated with a category, the event is one of a plurality of events that are associated with a user using one or more products; clustering the event with a group of events that are associated with the category; identifying at least a portion of the group of events and at least a portion of another group of events of another category, based on one or more time periods; and providing the at least the portion of the group of events and the at least the portion of the another group of events of the another category for visual presentation.

20 Claims, 7 Drawing Sheets

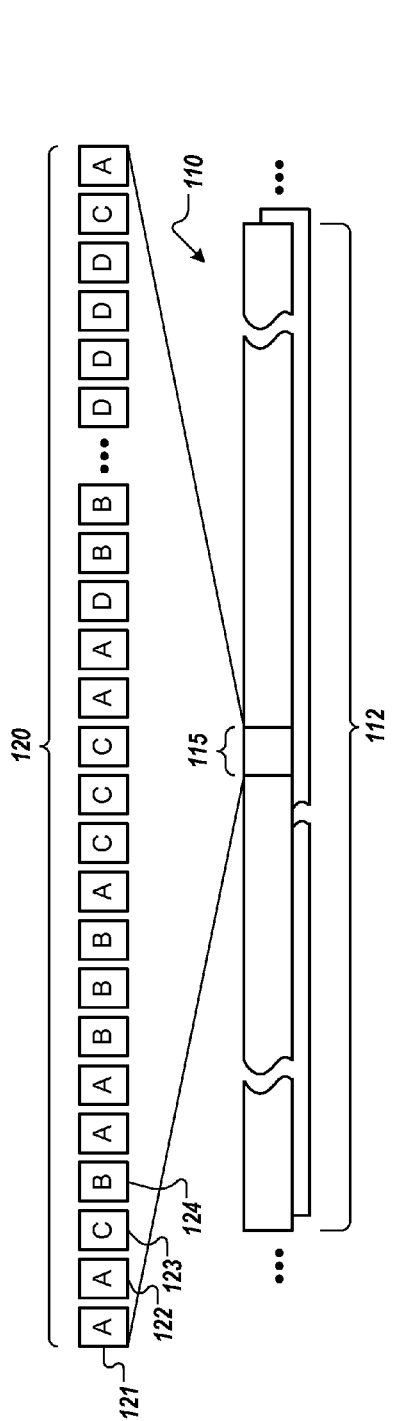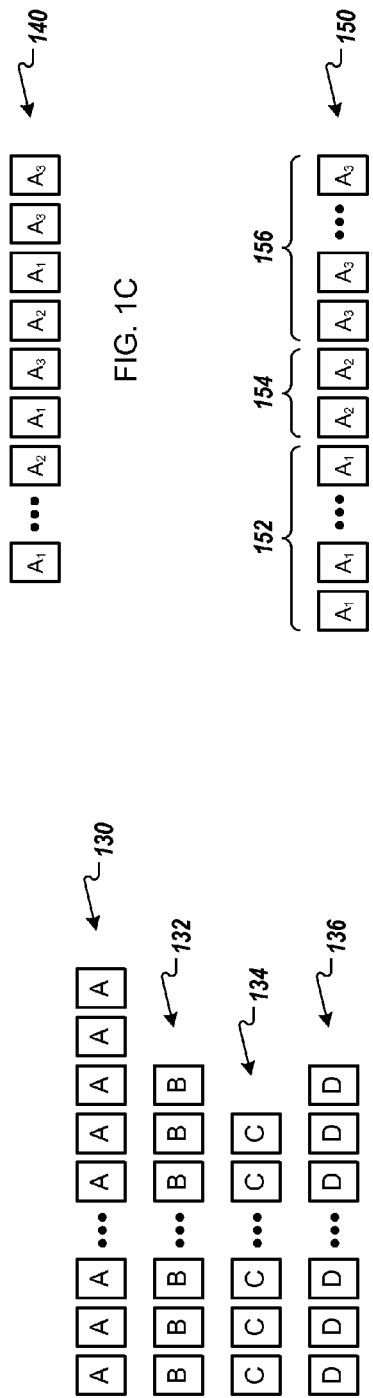

SYSTEMS AND METHODS FOR ATTRIBUTE-BASED USER DATA VISUALIZATIONS

BACKGROUND

1. Field

The subject matter discussed herein relates generally to data processing and, more particularly, to systems and methods for attribute-based user data visualizations.

2. Related Background

A user's history of using a product or service, if allowed by the user to be preserved, is typically provided or presented to the user, upon request, in a sequential list of text. The user would need to peruse the text to identify information of interest.

To identify information from multiple sources of usage history (i.e., the history of using multiple products and/or services), a user would need to peruse multiple sources of information. For example, if a user wants to know what he or she did last summer, the user would need to piece together information from different sources, if the information was being preserved.

SUMMARY

The subject matter includes methods for attribute-based user data visualizations, including determining that an event is associated with a category, the event being one of a plurality of events that are associated with a user using one or more products; clustering the event with a group of events that are associated with the category; identifying at least a portion of the group of events and at least a portion of another group of events of another category, based on one or more time periods; and providing the at least the portion of the group of events and the at least the portion of the another group of events of the another category for visual presentation.

The methods are implemented using one or more computing devices and/or systems. The methods may be stored in computer-readable media.

BRIEF DESCRIPTION OF THE DRAWINGS

FIG. 1A shows example user data.

FIG. 1B shows example groups of user data.

FIG. 1C shows an example group of user data that may be sub-grouped.

FIG. 1D shows example sub-groups of user data.

DETAILED DESCRIPTION

Figure 2:
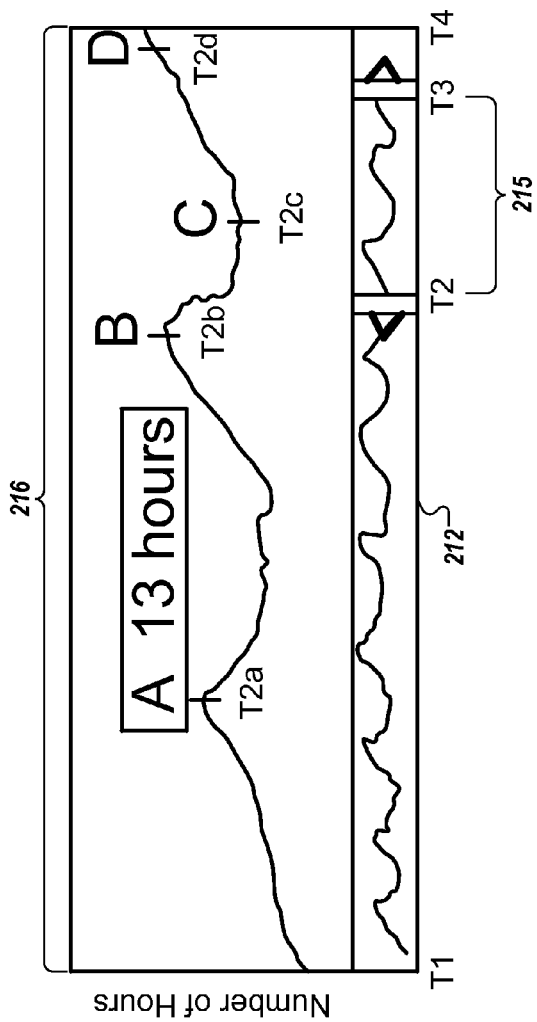
FIG. 2 shows an example visualization of user data.

The subject matter described herein is taught by way of example implementations. Various details have been omitted for the sake of clarity and to avoid obscuring the subject matter. The examples shown below are directed to structures and functions for implementing systems and methods for attribute-based user data visualizations.

FIG. 1A shows example user data. User data 110 may be any data associated with a user, such as data generated from using one or more products and/or services (e.g., websites, applications, mobile applications, etc.), web history data, uploaded data, communication data, social network data, etc. User data 110 may be produced and/or provided by one or more sources, including internal and/or external sources (e.g., data generated from services from one or more service providers). In some environments, user data 110 may be stored in more than one location, log, database, etc.

User data 110 may include temporal information (e.g., time stamped data) and can be associated with a timeline. For example, user data 110 may include data in a time period 112 (e.g., one day, one hour, etc.), which includes smaller time periods, such as a time period 115. Data in time period 115 may be conceptually shown as data 120. Each frame or box of data 120 shows data associated with an event or activity (e.g., an action, an operation, a communication, a file, a system event, etc.).

In some example implementations, two or more related events or activities may be grouped as an incident. For example, a request for a file, a transmission of the file, a record stored indicating the transmission of the file, etc. may be recorded as a download incident. A search for "New Bay Bridge," the viewing of information relating to "New Bay Bridge," a sharing on a social network of an image of "New Bay Bridge," etc. may be grouped as an incident.

Data 120 show that data may be named, grouped, clustered, or otherwise categorized. Data 120 are shown categorized into, for example, four groups or categories represented by "A," "B," "C," and "D." For example, event, activity, or incident (collectively, event) 121 is categorized as "A," and so is event 122. Event 123 is categorized as "C." Event 124 is categorized as "B," and so on.

Events may be categorized automatically by a computing system (e.g., by hardware logic, an operating system, software application, any combination, etc. without user intervention). For example, a system may automatically create and/or maintain groups/categories. Categories may be created based on categorization established in the system for other areas (e.g., usage reports, resource allocations, etc.), based on existing or available categorization, based on products and services, based on partnership with other service providers, based on understanding of data (e.g., the content of the data, the metadata of the data, the headings/titles of the data, etc.), and/or based on other factors. Example categories include, but are not limited to, searching, emailing, video chatting, texting, blogging, video sharing, photo sharing, social network, calendar, cloud storage, music, maps, reviews (e.g., products, services, movies, etc.), recommendations (e.g., restaurant, etc.), mobile device applications, wallet, shopping, etc.

In some implementations, users (e.g., end users and/or administrators) may add, delete, modify, define, and redefine categories and/or sub-categories. For example, some categories may be defined or entered by administrators or programmer (e.g., searching, emailing, texting, blogging, social network, calendar, music, maps, etc.) If a user's input is used to alter or redefine a category or sub-category (e.g., a system created category modified by a user), the user input may be learned by the system for use in other categories and/or sub-categories. For example, a user may redefine or further break down the searching category to include general searching, searching for recommendations, product searching, etc. The system may learn from the user's input and apply the redefined categorization on one or more other categories (e.g., emailing and blogging, such as general emailing, emailing regarding recommendations, emailing regarding products, etc.). The system may ask the user to confirm using the user's input for one category in another category (e.g., a user interface, not shown, that asks the user confirm applying the user's input in one or more categories).

FIG. 1B shows example groups of user data. Data or events may be grouped or clustered by categories. FIG. 1B shows that events of category A (events A) are clustered in group 130. Events B are clustered in group 132. Events C are clustered in group 134. Events D are clustered in group 134. Four categories are shown, but there can be fewer or more categories of events. Groups of events 130-136 may be clustered based on one or more other factors (e.g., time period, device used by the user, etc.). For example, group 130-136 may be events of one month (e.g., last month), events of this year, events between two days (e.g., identified by the user), etc.

FIG. 1C shows an example group of user data that may be sub-grouped. Group 140 of a category may be grouped into sub-categories. Sub-categories may be based on existing divisions of a category. For example, the category of news, may include headline news, national news, international news, financial news, sports, business news, science and technology news, environment news, etc. In some example implementations, a sub-category may be further divided. For example, financial news may be broken down to a second level of sub-categories that include, for example, corporate finance news, personal finance news, international finance news, etc. Sub-categories in group 140 are represented by "A1," "A2," and "A3," etc.

A user may define, modify, and/or add one or more sub-categories of any level. For example, for the category of online storage or cloud storage, a user may define sub-categories based on content of the user's files and data stored online (e.g., images, music, video, work related, personal, career, studies, etc.). A user may create a category or sub-category on the fly. For example, as the user upload a file to an online storage service, the user may create a category or sub-category (e.g., via a provided mechanism or user interface, not shown) and provide a label or name for the category or sub-category (e.g., "Pets").

FIG. 1D shows example sub-groups of user data. Data or events may be grouped or clustered by sub-categories. FIG. 1D shows that events of category A (events A) are clustered in sub-groups 152-156 based on sub-categories "A1," "A2," and "A3," respectively. Three sub-categories are shown, but there can be fewer or more sub-categories of events. Sub-groups of events 152-156 may be clustered based on one or more other factors (e.g., time period, user selection, sub-categories meeting one or more criteria, such as meeting one or more threshold numbers, etc.). For example, sub-groups 152-156 may be events of the top three sub-categories of the last two months, events of the summers, events between two days (e.g., predetermined by the system or system administrator), etc.

FIG. 2 shows an example visualization of user data. User data may be presented visually to the user. For example, data or events within a time period 212 (i.e., between T1 and T4 of a timeline) may be available for presenting. The user may change time period 212 to another period, longer or shorter. Within time period 212, a user may select a smaller time period or window 215, between T2 and T3, to visually view the user's data (e.g., selecting or adjusting the time window 215 using one or both arrows on the sides of the window). The time window 215 may be moved to the right or left, changing the time window.

Data of time period 212 may be presented visually in, for example, a window 216. Window 216 may show, for example, the time spent connected by the user between T2 and T3. The time spent connected may include data or events in a number of categories, including events A, B, C, and D, for example. Events A (i.e., events of category A) are clustered around time T2a. Events B, T2b; events C, T2c, and event D, T2d, for example. Event A may be "'Studying' for finals," which may be a user modified or defined category (e.g., the user identifies activities within a time period to be included in the category). Events B may be "Summer job," and events C, "Vacation to Paris," for example. Example events, such as "Vacation to Paris" or "Trip to Paris" are further described in FIG. 4, below.

The user may see the underlying data of a category (e.g., A) or perform one or more operation to that category of data by selecting the category of data. For example, the user may select the events A to see how many hours the user has spent in that category. In window 216, events A are shown with a box and the term "13 hours". The legend or label for the event "A—'Studying' for finals" may also be highlighted (e.g., with a box or a different color background, not shown). The user may select some events A and change their category (e.g., to C) and select events of other categories or non-categorized data and label them events A. The system may learn from the user's changing of event categorization, and apply the learning to existing categorization of data and/or future categorization of data.

Data or events not labeled (e.g., data between events A and B) may be not categorized, be categorized but not selected to be shown (e.g., not selected by the user), be categorized but not meeting a showing threshold, or be hidden for other reasons.

Figure 3:
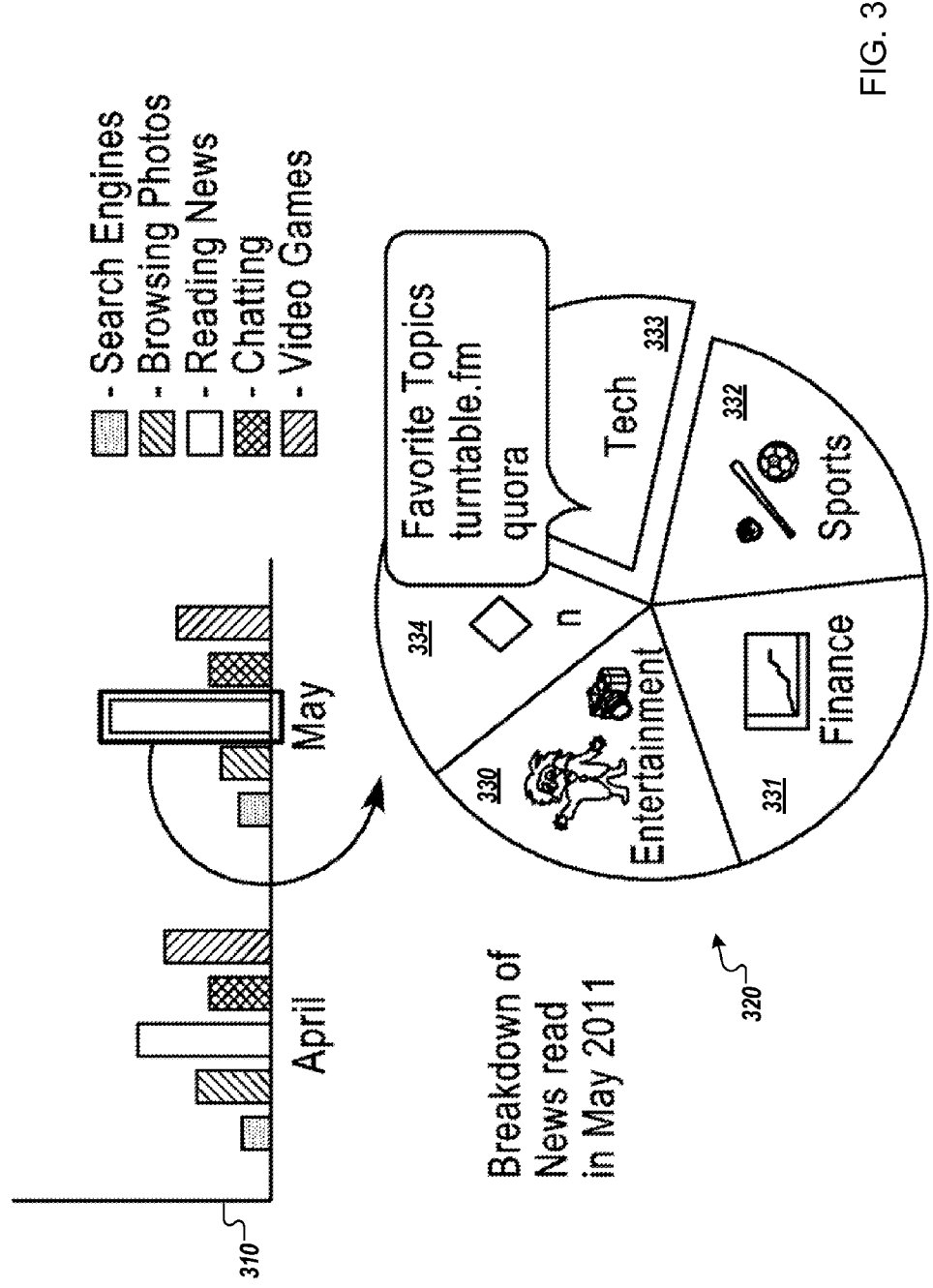
FIG. 3 shows other example visualizations of user data.

FIG. 3 shows other example visualizations of user data. User data may be intelligently grouped and/or presented in other visualizations. Data may be presented chronological or span-temporal bound (e.g., a category called "My Son before College" or "My Dog Puffy"). Data may be presented using any visualization, in two dimensions (2D) or three dimensions (3D) (e.g., bar charts, pie charts, line graphs, dashboards, dials, surface plots, waves, etc.). For example, data of five categories (e.g., "Search Engines," "Browsing Photos," "Reading News," "Chatting," and "Video Games") within the months of April and May of the year 2011 may be shown in a bar chart 310 with legends on the right. The time line or time window of April and May of 2011 may be selected by the user, who may increase or decrease the window. Data may be presented or viewed by days, weeks, or other time units or periods, which may be selected by the user. The user may select to view fewer time units (e.g., just one month) or more time units (e.g., three or four months, including the months of June and July, not shown).

Pie chart 320 shows that events of a category (e.g., "Reading News") may be presented in sub-categories visually. For example, when the user selects the "Reading News" bar in May, the "Breakdown of News read in May 2011" may be presented in sub-categories in pie chart 320 (or another chart, graph, or visualization, not shown). Pie chart 320 shows, for example, the category of "Reading News" includes five sub-categories 330-334. There may be other sub-categories not shown, because the user is not interested in viewing (e.g., not selected to be shown or selected to be hidden) and/or not meeting showing thresholds. Examples of some of the sub-categories include entertainment news, finance news, sports, technology news, etc.

Figure 4:
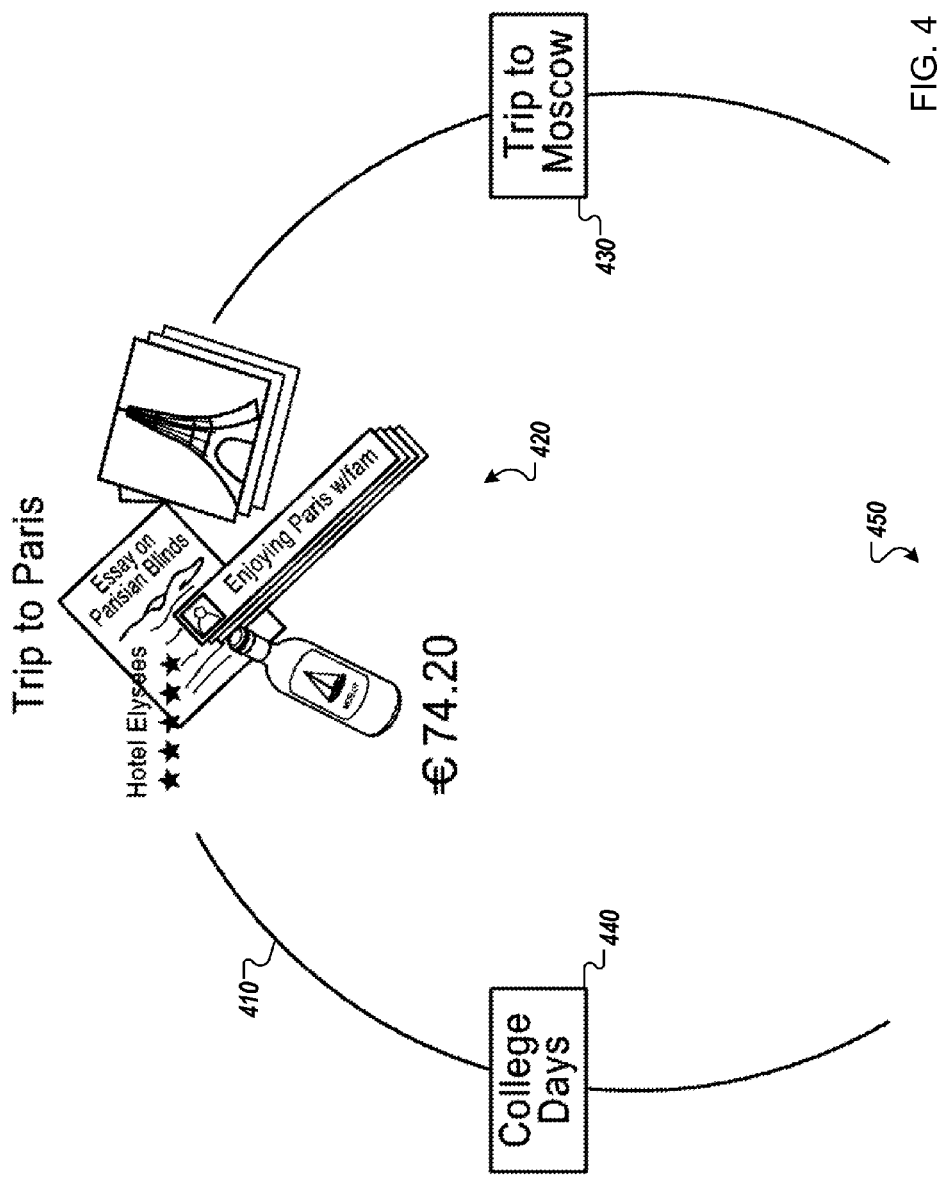
FIG. 4 shows additional example visualizations of user data.

FIG. 4 shows additional example visualizations of user data. User data may be presented with a visual organizer 410, such as a navigation line, art, circle, etc. Visual organizer 410 shows events of categories 420-440. There may be events 450 hidden from view. Events of categories 420-440 illustrate that events of a category may be from two or more sources.

In some example environments, multiple sources of data (e.g., user data from two or more products and/or services) may be grouped in one category 420, 430, or 440. After prompting or otherwise obtaining the user's permission to use his or her data from different sources, these data may be grouped in one or more categories, which may be modified by the user. For example, one source of user data may be location data, e.g., the user allows the use of the user's location information, such as internet protocol (IP) address, global positioning system (GPS) coordinates or the like from one or more of devices used by the user. Another source of data the user allows to use may be the user's calendar data or the user's uploaded photos.

The "Trip to Paris" event 420 may be formed automatically by the system, for example, with the user's calendar entries that show arriving and/or departing Paris on certain dates. The user's location data may show that the user was in Paris or the vicinity of Paris during those dates. Or the user's uploaded photos may be labeled as "Paris photos." Events from these sources may be categorized based on their association with the word "Paris." The user may modify the "Trip to Paris" category by, for example, adding sources of data, adding events to the categories, or removing events from the category. The user may also create the "Trip to Paris" category based on relative attributes by, for example, identifying events of different sources within a time period and label the event as "Trip to Paris."

The "Trip to Moscow" event 430 and the "College Days" event 440 may be similarly as the "Trip to Paris" event described above.

Figure 5:
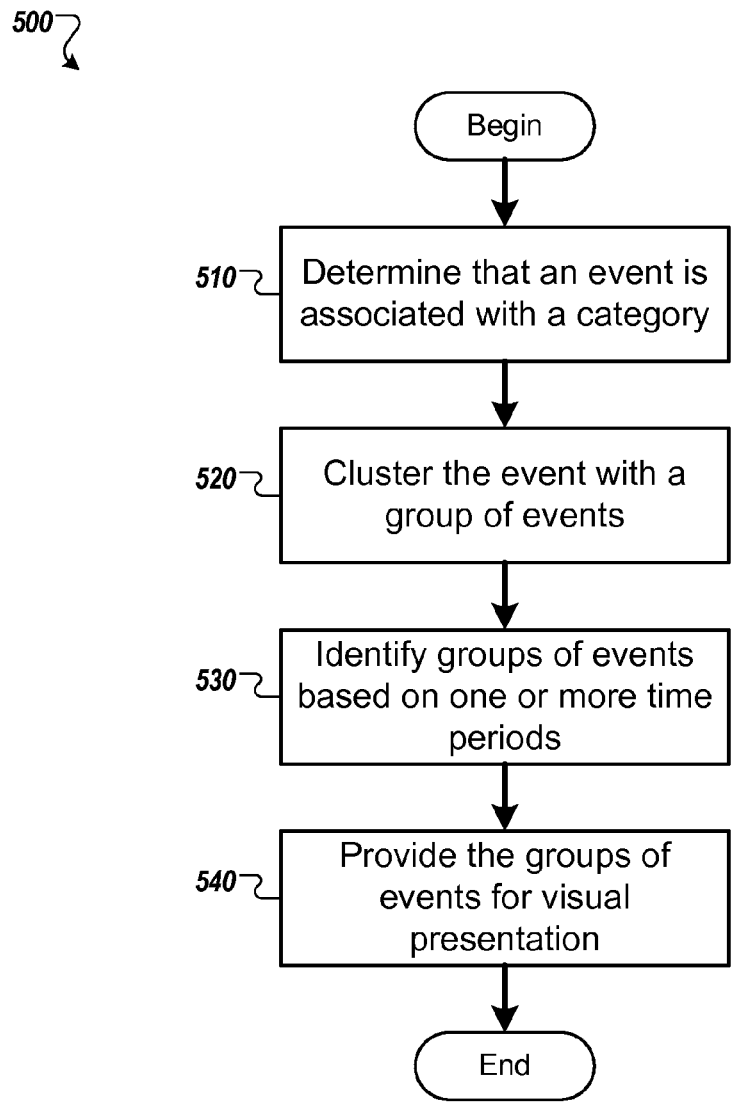
FIG. 5 shows an example of a process implementation.

FIG. 5 shows an example of a process implementation. At block 510, an event may be determined or identified to be associated with a category. The determination may be performed on one or more sources of data associated with a user. The sources of data may includes usage history or data of one or more products and/or services. At block 520, the event may be clustered or grouped with other events of the same category. There may be different groups of events of different categories. At block 530, portions of some groups of events may be presented visually to the user. The portions may be identified based on one or more time periods. For example, the user wants to see two months of data. At block 540, the identified portions are provided for visual presentation.

In some examples, process 500 may be implemented with different, fewer, or more blocks. Process 500 may be implemented as computer executable instructions, which can be stored on a medium, loaded onto one or more processors of one or more computing devices, and executed as a computer-implemented method.

Figure 6:
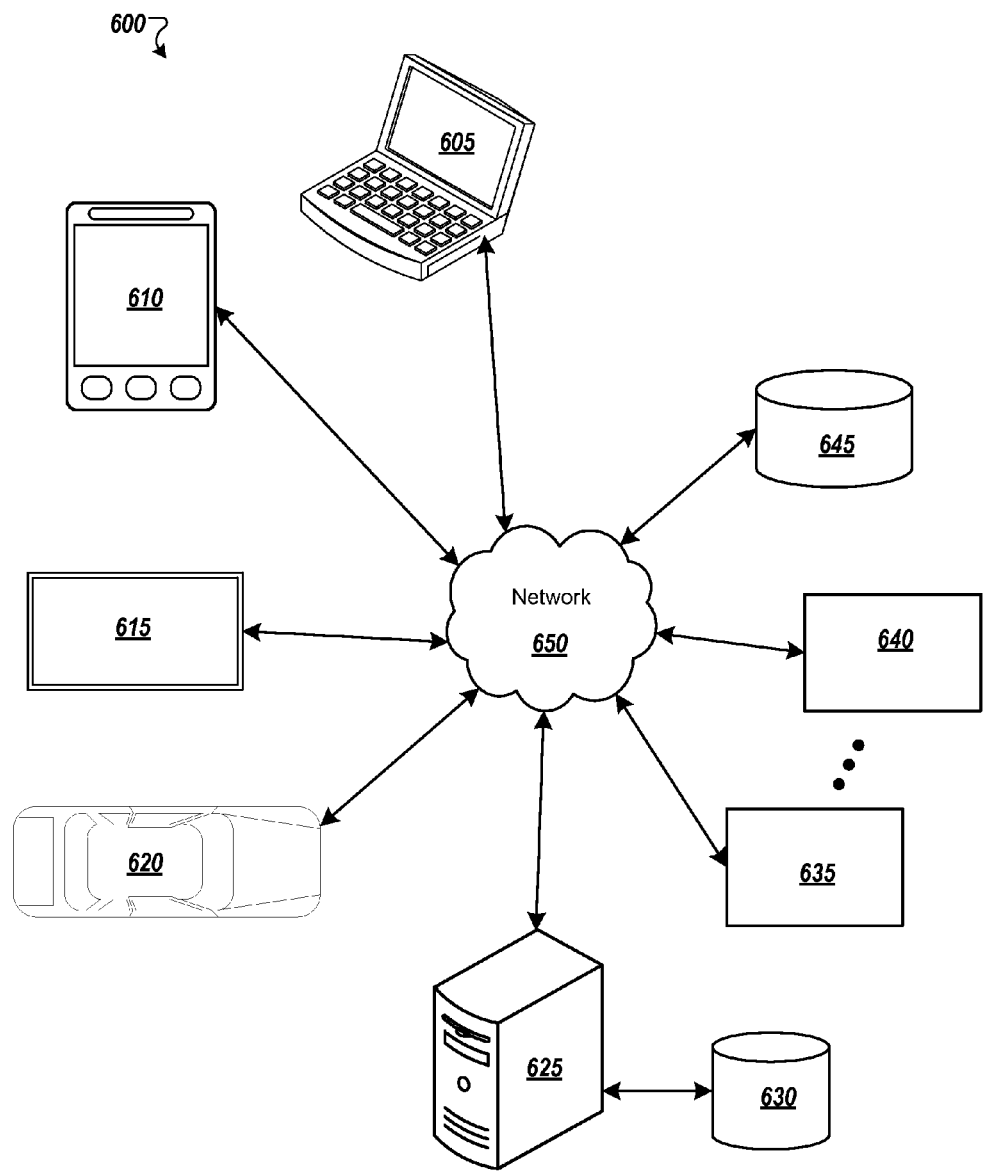
FIG. 6 shows an example environment suitable for some example implementations.

FIG. 6 shows an example environment suitable for some example implementations. Environment 600 includes devices 605-645, and each is communicatively connected to at least one other device via, for example, network 660 (e.g., by wired and/or wireless connections). Some devices may be communicatively connected to one or more storage devices 630 and 645.

An example of one or more devices 605-645 may be computing device 705 described below in FIG. 7. Devices 605-645 may include, but are not limited to, a computer 605 (e.g., a laptop computing device), a mobile device 610 (e.g., smartphone or tablet), a television 615, a device associated with a vehicle 620, a server computer 625, computing devices 635-640, storage devices 630 and 645.

In some implementations, devices 605-620 may be considered user devices (e.g., devices used by users to access services and/or issue requests, such as on a social network). Devices 625-645 may be devices associated with service providers (e.g., used by service providers to provide services and/or store data, such as webpages, text, text portions, images, image portions, audios, audio segments, videos, video segments, and/or information thereabout).

For example, a user may access, view, and/or provide input to his or her product usage history using user device 605, 610, 615, or 620. The user's product usage history may be stored on one or more devices 625-645 and provided visually by device 625.

Figure 7:
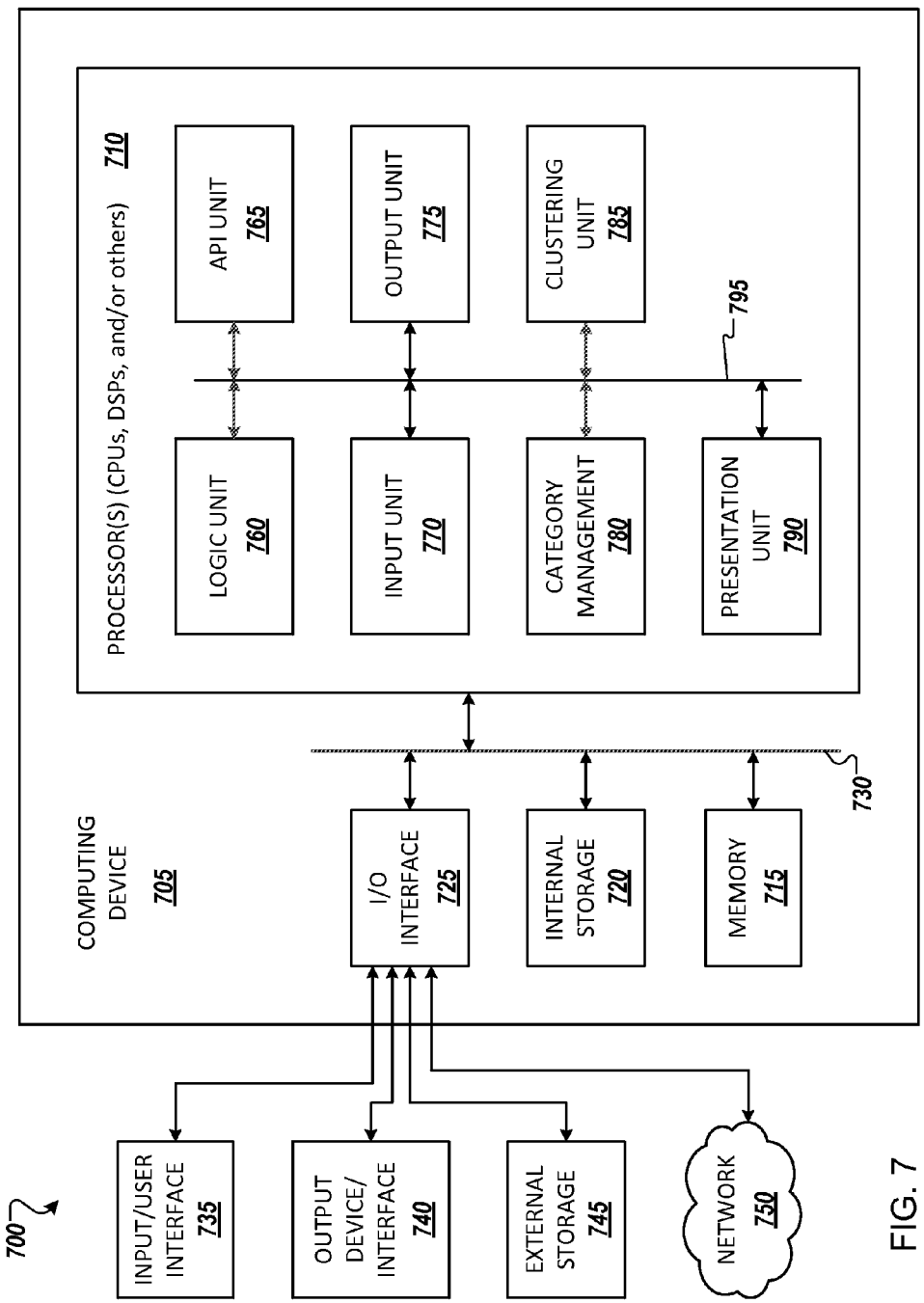
FIG. 7 shows an example computing environment with an example computing device suitable for use in some example implementations.

FIG. 7 shows an example computing environment with an example computing device suitable for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, category management 780, clustering unit 785, presentation unit 790, and inter-unit communication mechanism 795 for the different units to communicate with each other, with the OS, and with other applications (not shown). For example, category management 780, clustering unit 785, and presentation unit 790 may implement one or more processes and/or user interfaces shown and described in FIGS. 1-5. The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775, category management 780, clustering unit 785, and presentation unit 790). For example, after input unit 770 has detected a user request for accessing the user's data (e.g., product usage history, etc.), input unit 770 may use API unit 765 to communicate the user request to category management 780. category management 780 may, via API unit 765, interact with the clustering unit 785 to identify events and create clusters of events based on categories. Using API unit 765, category management 780 may interact with presentation unit 790 to provide some or all of the clusters events for visual presentation.

In some instances, logic unit 760 may be configured to control the information flow among the units and direct the services provided by API unit 765, input unit 770, output unit 775, category management 780, clustering unit 785, and presentation unit 790 in some example implementations described above. For example, the flow of one or more processes or implementations may be controlled by logic unit 760 alone or in conjunction with API unit 765.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
   determining that an event is associated with a category, the event comprising one of a plurality of events that are associated with a user using one or more products;
   clustering the event with a group of events that are associated with the category;
   identifying at least a portion of the group of events and at least a portion of another group of events of another category, based on one or more time periods;
   providing the at least the portion of the group of events and the at least the portion of the another group of events of the another category for visual presentation, wherein the visual presentation comprises a graphical user interface (GUI) that includes a timeline providing the at least the portion of the group of events and the at least the portion of the another group of events in time intervals; and
   presenting, in the GUI, an object that provides the user with a displayed user interface object to adjust a start time and a finish time of the timeline associated with the providing, based on an input by the user, wherein the portion of the group of events and the at least the portion of the another group of events of another category that have been clustered are displayed based on the start time and the finish time.

2. The method of claim 1, wherein the at least the portion of the group of events is presented grouped by sub-categories of the category.

3. The method of claim 1, wherein the visual presentation comprises a timeline providing the at least the portion of the group of events and the at least the portion of the another group of events in time intervals.

4. The method of claim 1, wherein the visual presentation comprises a chart or graph.

5. The method of claim 1, wherein the determining that an event is associated with the category comprises analyzing a plurality of sources of information to identify the event based on the category.

6. The method of claim 1, wherein the category is defined with user input.

7. The method of claim 1, wherein the category is automatically created without user intervention.

8. The method of claim 1, wherein the category is a time period associated with the user.

9. The method of claim 1, wherein the group of events comprise events from two or more sources associated with the user.

10. The method of claim 1, wherein the category is associated with one of the one or more products.

11. A non-transitory computer readable medium having stored therein computer executable instructions for:
   determining that an event is associated with a category, the event comprising one of a plurality of events that are associated with a user using one or more products;
   clustering the event with a group of events that are associated with the category;
   identifying at least a portion of the group of events and at least a portion of another group of events of another category, based on one or more time periods;
   providing the at least the portion of the group of events and the at least the portion of the another group of events of the another category for visual presentation, wherein the visual presentation comprises a graphical user interface (GUI) that includes a timeline providing the at least the portion of the group of events and the at least the portion of the another group of events in time intervals; and
   presenting, in the GUI, an object that provides the user with a displayed user interface object to adjust a start time and a finish time of the timeline associated with the providing, based on an input by the user, wherein the portion of the group of events and the at least the portion of the another group of events of another category that have been clustered are displayed based on the start time and the finish time.

12. The computer readable medium of claim 11, wherein the determining that an event is associated with the category comprises analyzing a plurality of sources of information to identify the event based on the category.

13. The computer readable medium of claim 11, wherein the category is defined with user input.

14. The computer readable medium of claim 11, wherein the category is automatically created without user intervention.

15. The computer readable medium of claim 11, wherein the group of events comprises events from two or more sources associated with the user.

16. At least one computing device comprising storage and a processor configured to perform:
   determining that an event is associated with a category, the event comprising one of a plurality of events that are associated with a user using one or more products;
   clustering the event with a group of events that are associated with the category;
   identifying at least a portion of the group of events and at least a portion of another group of events of another category, based on one or more time periods;
   providing the at least the portion of the group of events and the at least the portion of the another group of events of the another category for visual presentation, wherein the visual presentation comprises a graphical user interface (GUI) that includes a timeline providing the at least the portion of the group of events and the at least the portion of the another group of events in time intervals; and
   presenting, in the GUI, an object that provides the user with a displayed user interface object to adjust a start time and a finish time of the timeline associated with the providing, based on an input by the user, wherein the portion of the group of events and the at least the portion of the another group of events of another category that have been clustered are displayed based on the start time and the finish time.

17. The at least one computing device of claim 16, wherein the determining that an event is associated with the category comprises analyzing a plurality of sources of information to identify the event based on the category.

18. The at least one computing device of claim 16, wherein the category is defined with user input.

19. The at least one computing device of claim 16, wherein the category is automatically created without user intervention.

20. The at least one computing device of claim 16, wherein the group of events comprise events from two or more sources associated with the user.

\* \* \* \* \*